Patented Apr. 12, 1949

2,467,159

UNITED STATES PATENT OFFICE 2,467,159

METHOD OF PRODUCING FUSED BERYLLIUM OXIDE

Anton Schormuller and Charles E. Windecker, Painesville, Ohio, assignors to Clifton Products, Inc., Painesville, Ohio No Drawing. Application February 27, 1946, Serial No. 650,730

4 Claims. (Cl. 13—34)

1

This invention relates to the production of thoroughly fused beryllium oxide which is relatively free of impurities.

The academic knowledge that beryllium oxide melts at about 2500° C. has been known for over twenty years. Mellor's "Comprehensive Treatise of Inorganic and Theoretical Chemistry" (Ed. 1923), vol. 4, p. 222, sets out the melting point that several investigators have respectively tabulated. All investigators stated it was very volatile near the ascribed melting point.

There is a limited number of patents that touch upon either the phenomena of melting or volatilization. U. S. Patent #1,980,675 mentions that "pure beryllium oxide is a light fluffy material which has a melting point around 2500° C.," i. e. 4532° F. There are also these rather vague words in U. S. Patent #2,033,300: "at temperatures which which are far below the fusing temperature of beryllium oxide." According to U. S. Patent #1,001,571, a mixture of alumina and beryllium oxide may be fused in an arc type vertical electrode furnace. And in U. S. Patent #1,777,122 there is mention that beryllium oxide can be volatilized.

However, the production of a refractory beryllium oxide which is thoroughly fused and which contains less than 2% of sintered beryllium oxide cannot be solved from a study of any or all of the patent or academic references. Particularly is this true as compared to the present process which gives a clinker of less than 2% sintered oxide, which clinker is substantially free of metallic impurities, carbides and free carbon.

It is an object of this invention to produce a beryllium oxide particularly suitable as a refractory.

Another object of this invention is to produce a fused beryllium oxide characterized by non-shrinkage when subsequently fired.

A further object of this invention is to provide a method of making fused beryllium oxide containing less than 2% of sintered beryllium oxide.

A still further object of this invention is to gain a density of beryllium oxide approaching its theoretical density (3.06). The practical maximum density of fused beryllium oxide produced by applicants' method is 2.86.

Another object of this invention is to produce a fused beryllium oxide substantially free of the metallic impurities present in normally calcined (1100–1250° C.) beryllium oxide, and substantially free of both carbides and carbon formed incidentally in the fusion operation.

Other and further objects of this invention will become apparent from the following description.

The present invention embraces the heating of beryllium oxide above its melting point, whereby it is thoroughly and completely melted. The melt-

2 ing point of beryllium oxide is around 2500° C., i. e., 4532° F. according to U. S. Patent #1,980,675. In the present method a temperature in the range of 4685° F. and above is employed. But precaution not to super-heat the melt should be observed, as considerable volatilization of beryllium oxide would take place. The high heat and the thorough fusion of the charge in the arc volatilize most of the metallic and other impurities, e.g. Al, Fe, Zn, Si, etc. from the beryllium oxide. With very high grade beryllium oxide such impurities may be almost if not completely non-existent. This heat range decomposes any beryllium carbide which might form intermittently. By admitting some air into the furnace, small amounts of carbon which might fall off the carbon electrodes or which might be generated by the decomposition of the carbides are enabled to be consumed.

By employing electrodes set at a small angle from the horizontal they can be withdrawn from the fused mass before its rapid solidification. Because the electrodes do not become stuck in the clinker the hazard of breaking or the necessity of great force is eliminated. Moreover, by so doing the electrodes are preserved and clean electrode tips are secured. This allows the arc to be formed immediately at the beginning of the following run.

There are various advantages to our process when considered from the mechanic and electric aspect alone. The electrical efficiency, and therefore the economy of the present method is excellent. In addition, no water cooling is applied to the furnace walls which would carry away the heat lost for the melting operation.

The thoroughly fused beryllium oxide produced by the present invention as described more in detail herein is particularly suitable for refractories.

For a fuller understanding of the nature and objects of this invention, reference should be had to the following example which is given merely to illustrate the invention and is not to be construed in a limiting sense.

*Example*

The furnace, which has a well insulated iron shell or box constructed of high grade fire bricks, is lined with refractory beryllium oxide. Two carbon electrodes on opposite sides of the furnace are mounted on movable carriers having an inclination of about 15–20°. The furnace has a side door. The oxide covering the inside of the door provides an excellent insulation for this door which, therefore, can be constructed of light gauge steel. The special beryllium oxide lining excludes all contaminants and is long-lasting.

The operation with this furnace is so planned that the electrodes, arc and melt are continuously surrounded to a considerable depth with normally calcined (1100–1250° C.) beryllium oxide. This type calcined beryllium oxide is continuously fed into the furnace through an opening above a side door during the entire first cycle of heating. This cycle is about two-thirds of the total time of heating. In the remaining third of the heating, the second cycle, the melted beryllium oxide is exposed on the surface to a current of air which burns off the carbon formed by the decomposition of carbides caused by the high temperature. Small amounts of carbon may fall off the carbon electrodes or may be generated by the decomposition of the carbides.

The beryllium oxide in the alternating current arc is completely melted, the said oxide having a temperature of 2585° C. (4685° F.) or slightly above. Care must be taken not to super-heat the melt, as considerable volatilization of beryllium oxide would take place. At this temperature heavy metallic and other impurities are volatilized and pass out of the melted mass.

After the completion of the melt and a clinker of about 35–50 pounds has formed, the flow of current is broken; the electrodes are pulled back and free of the melt. A waiting period is interposed to permit solidification of the fused beryllium oxide. The clinker is thereupon removed from the furnace with tongs.

While for purposes of illustration we have disclosed one example for producing this type of fused beryllium oxide, it is obvious that various changes can be made without departing from the scope of the invention as set out in the appended claims. In the claims the term "thoroughly fused beryllium oxide" denotes a content of less than 2% of the suitered oxide in the clinker. The term "oxygen-containing gas" denotes a gas which in toto or in part is composed of free or uncombined oxygen.

We claim:

1. In the process of producing thoroughly fused beryllium oxide, the steps of forming an arc between two carbon electrodes in a furnace, which electrodes are surrounded with calcined, unfused beryllium oxide, thus heating this oxide to 4685° F. but avoiding a temperature much above which results in significant vaporization of beryllium oxide, feeding additional calcined, unfused beryllium oxide over the arc in such a manner as to completely cover the electrodes while continuing the heating under the same conditions until substantially that amount equal to the total batch charge has been fused, thereafter exposing the surface of the melted beryllium oxide to an oxygen-containing gas, breaking the flow of the electric current and drawing away the carbon electrodes, which are positioned at an angle from the horizontal, clear and free from the melt, and thereafter allowing the clinker to cool down to secure solidification of the fused beryllium oxide.

2. In the process of producing thoroughly fused beryllium oxide, the steps of forming an arc between two carbon electrodes in a furnace, which electrodes are surrounded with calcined, unfused beryllium oxide, thus heating this oxide to 4685° F. but avoiding a temperature much above this which results in significant vaporization of beryllium oxide, feeding additional calcined, unfused beryllium oxide over the arc in such a manner as to completely cover the electrodes while continuing the heating under the same conditions, this cycle comprising about two-thirds of the total time of heating, thereafter exposing the surface of the melted beryllium oxide to an oxygen-containing gas, breaking the flow of the electric current and drawing away the carbon electrodes, which are positioned at an angle from the horizontal, clear and free from the melt, and thereafter allowing the clinker to cool down to secure solidification of the fused beryllium oxide.

3. In the process of producing thoroughly fused beryllium oxide, the steps of forming an arc between two carbon electrodes in a furnace, which electrodes are surrounded with calcined, impure, unfused beryllium oxide, thus both heating this oxide to 4685° F. but avoiding a temperature much above this which results in significant vaporization of beryllium oxide, and removing from the resulting fused mass that part of the impurities which volatilize in this heating range, feeding additional calcined, impure, unfused beryllium oxide over the arc in such a manner as to completely cover the electrodes while continuing the heating under the same conditions until substantially that amount equal to the total batch charge has been fused, thereafter exposing the surface of the melted beryllium oxide to an oxygen-containing gas, breaking the flow of electric current and drawing away the carbon electrodes, which are positioned at an angle from the horizontal, clear and free from the melt, and thereafter allowing the clinker to cool down to secure solidification of the fused beryllium oxide.

4. In the process of producing thoroughly fused beryllium oxide, the steps of forming an arc between two carbon electrodes in a furnace, which electrodes are surrounded with calcined, impure, unfused beryllium oxide, thus both heating this oxide to 4685° F. but avoiding a temperature much above this which results in significant vaporization of beryllium oxide, and removing from the resulting fused mass that part of the impurities which volatilize in this heating range, feeding additional calcined, impure, unfused beryllium oxide over the arc in such a manner as to completely cover the electrodes while continuing the heating under the same conditions, this cycle comprising about two-thirds of the total time of heating, thereafter exposing the surface of the melted beryllium oxide to an oxygen-containing gas, breaking the flow of the electric current and drawing away the carbon electrodes, which are positioned at an angle from the horizontal, clear and free from the melt, and thereafter allowing the clinker to cool down to secure solidification of the fused beryllium oxide.

ANTON SCHORMULLER.
CHARLES E. WINDECKER.

REFERENCES CITED

The following references are of record in the file of this patent:

UNITED STATES PATENTS

| Number | Name | Date |
|---|---|---|
| 430,453 | Willson | June 17, 1890 |
| 682,337 | Nielsen | Sept. 10, 1901 |
| 785,841 | Turner | Mar. 28, 1905 |
| 884,463 | Burgess | Apr. 14, 1908 |
| 1,352,388 | Saunders | Sept. 7, 1920 |
| 1,512,271 | Burgess | Oct. 21, 1924 |
| 1,545,951 | Fairchild et al. | July 14, 1925 |
| 1,905,340 | Burgess | Apr. 25, 1933 |

FOREIGN PATENTS

| Number | Country | Date |
|---|---|---|
| 27,744 | Great Britain | 1913 |